Nov. 24, 1959 J. D. CLYMER 2,913,987
SWIVELLING JUNCTION BOX
Filed Oct. 10, 1955 3 Sheets-Sheet 3

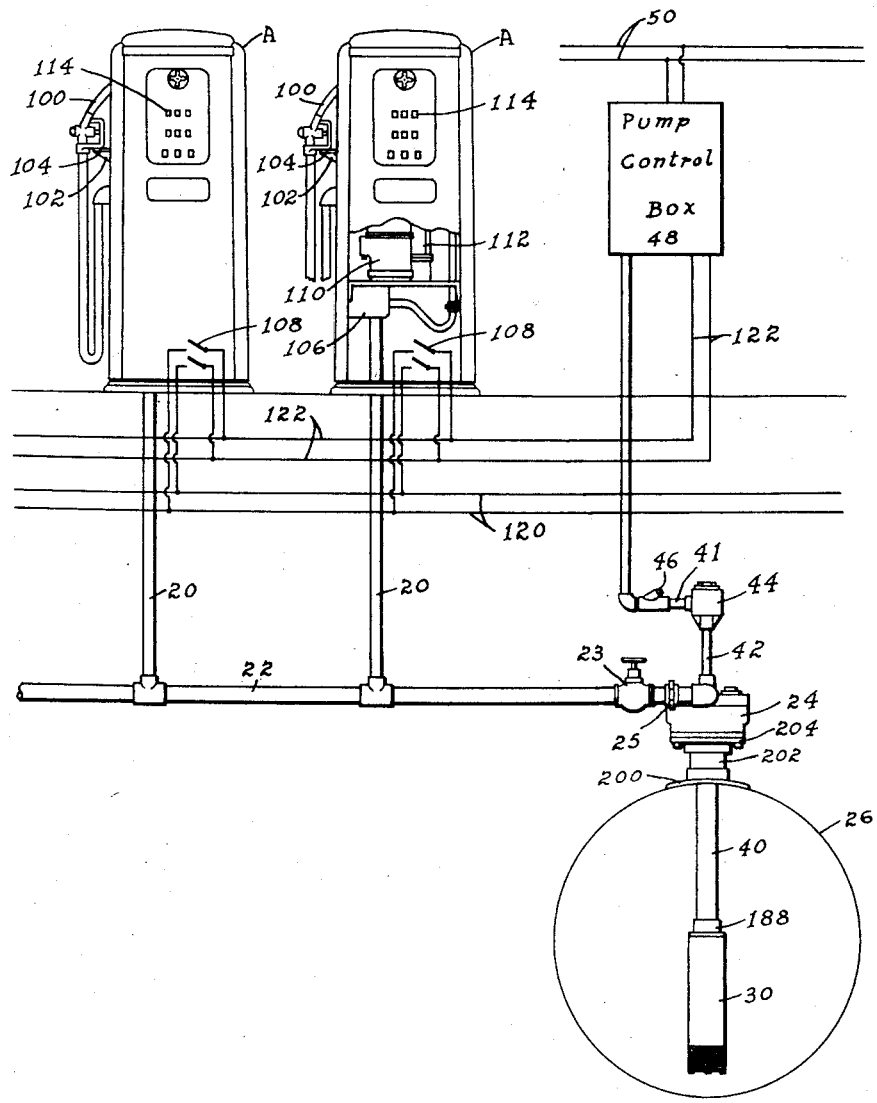

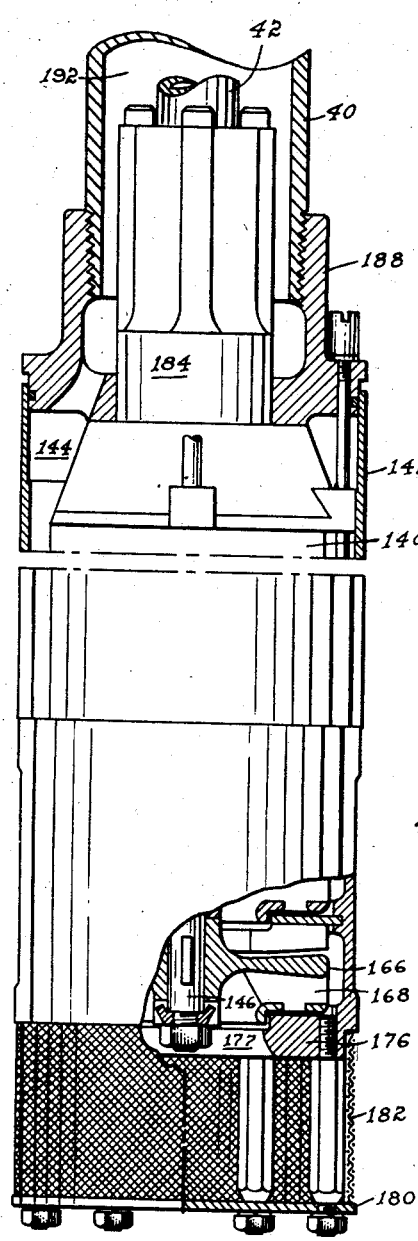
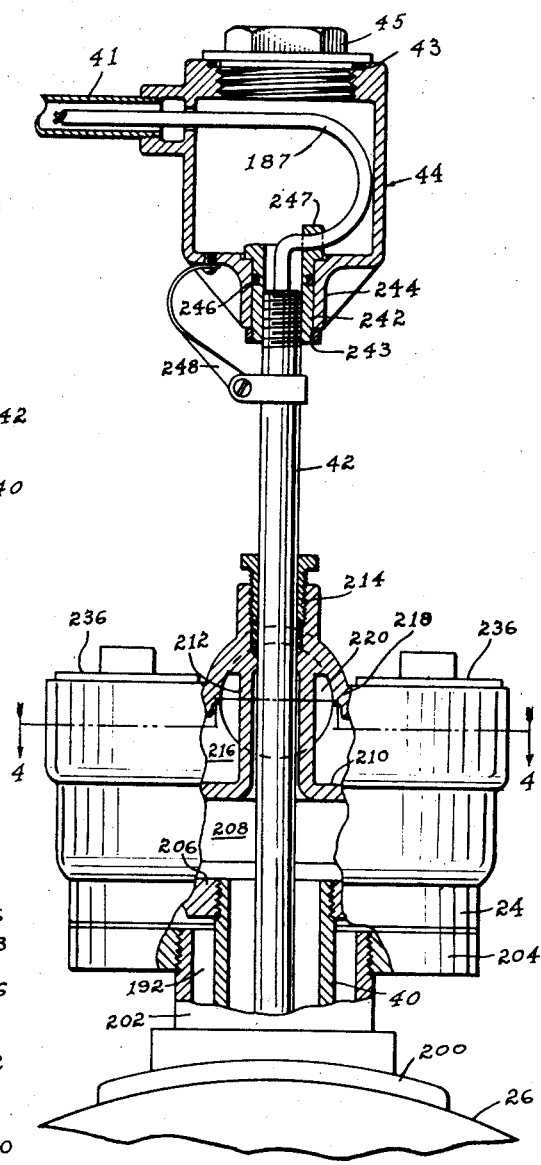

INVENTOR.
JOSEPH D. CLYMER
BY
Edmund W.E. Kamm
ATTORNEY

United States Patent Office 2,913,987
Patented Nov. 24, 1959

2,913,987

SWIVELLING JUNCTION BOX

Joseph D. Clymer, Fort Wayne, Ind., assignor to Tokheim Corporation, Fort Wayne, Ind., a corporation of Indiana Application October 10, 1955, Serial No. 539,525

18 Claims. (Cl. 103—87)

This invention relates to a swivelling junction box. More specifically it relates to a junction box which is vapor proof and which is adapted to be connected with vapor proof, rigid, electric wire conduits wherein at least two of the conduits leave the box in non-coaxial directions and said junction box being constructed and arranged to enable one conduit to be swivelled with respect to the other for orientation in a desired direction.

It is an object of the invention to provide a junction box which has a cavity of sufficient size to accommodate the terminals of various wires, and the means for connecting the terminals and which includes a removable cover for providing ready access to the wires for manipulation.

Another object of the invention is to provide a vapor proof swivel joint between the junction box and one conduit.

A further object of the invention is to provide means for preventing the transmission of strain from the wires in one conduit to those in another.

Still another object of the invention is to provide a ground which connects portions of the junction box which are disposed on opposite sides of the swivel joint.

Yet another object of the invention is to provide means for limiting the rotation of the junction box with respect to one of the conduits in either direction.

These and other objects will become apparent from a study of this specification and the drawings which are attached hereto, made a part hereof and in which:

Figure 1 shows the installation of the swivelled junction box in a submerged pump-motor gasoline dispensing system.

Figure 2 is an elevation, with parts broken away, of a submerged pump and motor used in a system of the kind described.

Figure 3 is a vertical sectional view of the swivelled junction box showing the conduit affixed thereto and the passage of the one conduit through the header.

Figure 6:
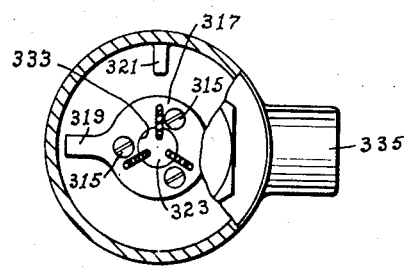
Figure 6 is a plan view of the junction box with parts broken away to show the stop means and anti-strain structure.

This application is a continuation in part of the application Serial Number 331,344, filed by Wright, Clymer and Jackson on January 15, 1953 for Dispensing Apparatus for Liquid Fuel, now Patent No. 2,812,111.

Referring first to Figure 1, it will be seen that one application of the swivelling junction box is in a dispensing apparatus for liquid fuel, such as gasoline, in which the fuel is pumped from a supply tank by a submerged pump and motor and delivered to one or more dispensing stands under pressure.

In the gasoline dispensing installation shown in Figure 1, a group of a plurality of dispensing stands A are connected by a supply line 20 to a main line 22 which is connected through a valve 23 and a union 25 to a header 24 on a supply tank 26. The header 24 supports, in a submerged position in the tank, a motor and pump unit 30.

The motor and pump unit 30 is carried by a supporting delivery pipe 40, and the motor of the motor-pump unit 30 is supplied with current through a conduit 42 which extends co-axially through the pipe 40 and leads to a junction box 44. The junction box 44 is connected by a conduit 41, which includes a seal fitting 46, to a control box 48 which contains a starting relay, supplied with current from a suitable supply line 50.

Each of the dispensing stands A includes a dispensing line normally containing a meter 112 and a register 114 and other related mechanism. In addition, the dispensing line of each stand is desirably connected to its supply line 20 through a hydraulic valve mechanism 110 as disclosed in application Serial Number 186,815, filed September 26, 1950, now Patent No 2,732,103. The dispensing line of each stand leads to and includes a dispensing hose terminating at a manually operated valved nozzle 100. A storage bracket 102 is provided for the nozzle and has associated with it, a control lever 104 which lies in depressed position when the nozzle is stored and the stand is not in operation.

Each of the stands also includes a switch box 106 containing a double-pole control switch 108. Switch 108 is mechanically interconnected to the control lever 104, for actuation to closed position by lifting of control lever 104, and for actuation to open position by depressing the control lever 104 either manually or by the act of hanging the nozzle 100 on the bracket 102. The stand controls thus operate in the same way as conventional gasoline dispensing stands, in a manner to which service-station attendants are accustomed.

The control switches 108 are connected to close a two-wire circuit from a supply line 120 to a control line 122 leading to the control box 48.

The pump and motor unit 30 is of the construction which is shown in Figure 2. Each unit comprises a sealed electric motor assembly 140 of long, cylindrical configuration mounted coaxially within a surrounding sleeve 142. The pump is mounted at the lower end of this assembly, and the space between the casing of the motor 140 and the sleeve 142 provides an annular delivery passage 144 leading upward from the pump.

The electric motor 140 used may be a 250 volt, 60 cycle A.C. motor operating at about 3500 r.p.m. which has a shaft 146 to which are fixed one or more impellers 166 of the pump. A three stage pump is preferred. Desirably, a screen 182 is mounted between the end plate 176 and a baffle plate 180 to prevent the entrance of foreign matter to the pump.

The upper end of the motor assembly 140 carries an axially extending fitting 184 to receive the electric supply conduit 42 through which a supply cable 187 leads to the motor. The upper end of the motor assembly 140 carries an axially extending fitting 184 to receive the electric supply conduit 42 through which a supply cable 187 leads to the motor. The upper end of the motor housing is sealed, and connections are made from the supply cable to the motor windings through hermetically sealed leads. Above such leads, the fitting 184 and conduit 42 form a sealed cable passage leading to the junction box 44 and through such box to the seal fitting 46.

Surrounding the central conduit fitting 184, there is an outer collar 188 by which the whole motor and pump unit is mounted on the supporting delivery pipe 40. The annular space between the pipe 40 and fitting 184 and conduit 42 forms an upwardly leading delivery passage 192 communicating with the pump delivery passage 144.

The motor and pump unit 30 is supported by its delivery pipe 40 from the header 24. The tank carries a standard tank fitting 200 into which is threaded a pipe 202 of a suitable length to dispose the header at the desired level, usually in a covered pit below ground level. The upper end of such pipe 202 carries a flange 204 on which the header 24 is mounted. The pump supporting pipe 40 and conduit 42 are of suitable length to position the pump close to the bottom of the tank.

The header 24 has a bottom wall 206 containing a central opening into which the pump supporting pipe 40 is threaded. A pressure chamber 208 is formed between the bottom wall 206 and an intermediate wall 210 and the latter has an upward extension 212 to pass the conduit 42 to a seal fitting 214 at the top of the header. A delivery passage 216 communicates with chamber 208 and with the line 22 through the outlet 220.

The upper end of the conduit 42 carries a junction box 44. The junction box 44 is mounted on the conduit by a sealed swivel joint, as shown in Figure 3. A mounting sleeve 242 is threaded on the upper end of the conduit, above a lock nut 243. The lower wall of the junction box 44 forms a hub 244 which is rotatably received on the sleeve 242 and is sealed thereto by a resilient annular gasket 246. The junction box 44 is electrically connected to the conduit 42 by a strap 248. Desirably, the electric supply cable 187 is clipped to the fixed sleeve 242 by a clip 247 to prevent twisting that cable within the conduit and also to prevent strain being transmitted to the cable connection at the motor.

It will also be noted that the strap 248 will limit the rotation of the junction box in either direction so that continued rotation in the same direction which would be likely to break the cable is prevented.

The connections are made, in the junction box, between the wires entering the box through conduit 41 from seal fitting 46 and the motor leads entering through conduit 42. After the connections are properly made and tucked into the box, the screw cap 45 is drawn down upon its gasket 43 to seal the box and render it vapor proof.

Since the conduit 41 enters the box laterally while conduit 42 enters it vertically, it will be seen that the swivel joint makes it possible to orient the conduit 41 in any direction in the plane of revolution described by it about the swivel to facilitate installation.

The general operation of the dispensing apparatus is as follows: When the nozzle 100 of any dispensing stand is lifted from its bracket 102 and the control lever 104 is lifted, the hydraulic valve 110 of that stand will be actuated to dispensing position and the control switch 108 of the stand will be closed. A control circuit will be established through control line 122 to the pump control box 48. This will actuate the pump control mechanism to start the pump 30 for the delivery of gasoline to the operated stand.

It is obvious that since the pipe 40 and conduit 42 occupy a fixed relation to each other, to the tank 26 and to the header 24 and since the pipes and conduits are made up with screwed or flanged connections which permit little alteration after they have been drawn up tight, the junction box 44 which swivels upon the conduit 42 enables the conduit 41 to be directed so as to meet the conduit leading from the control box, without necessitating the bending of the conduit. It thus facilitates the establishment of a fully vapor-proof conduit which is essential in dispensing systems for hazardous liquids.

In making new installations, the electric wires can be drawn through the conduit 41 from the control box and can be readily connected with the motor leads which enter the junction box through conduit 42. The clip prevents strain from being transmitted to the motor leads as the box swivels and prevents them from being twisted. As noted above the grounding strap 248 limits the rotation in either direction preferably to slightly less than 360 degrees. The exact limitation is, of course a function of the length and flexibility of the strap.

In the event it becomes necessary to remove the pump-motor unit from the tank, the pump leads may be disconnected from the rest of the cable at the junction box, the swivel joint and strap may be dismantled and the box 44 moved to one side and the pump-motor unit, pipe 40, header 24 and conduit 42 may be removed as a unit. The apparatus may, of course, be reassembled by reversing the process, using the repaired pump-motor unit or a substitute unit.

MODIFICATION

Figures 4, 5, 6 and 7

Figure 4:
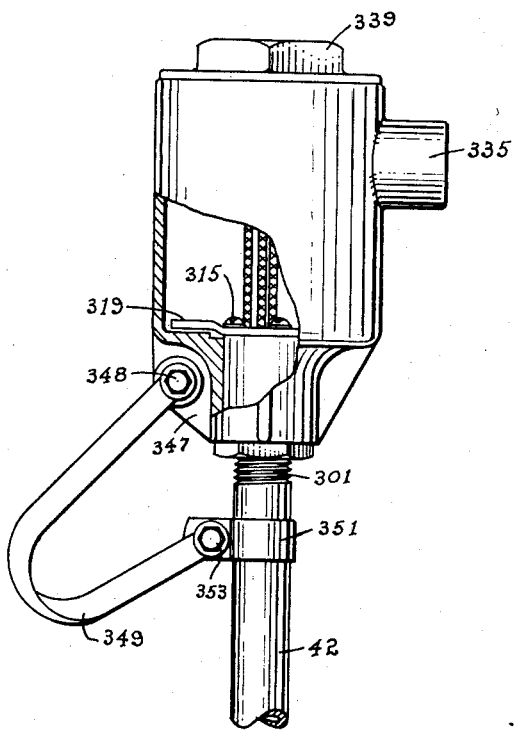
Figure 4 is vertical elevation, partly in section, showing a modified form of the junction box.
Figure 5:
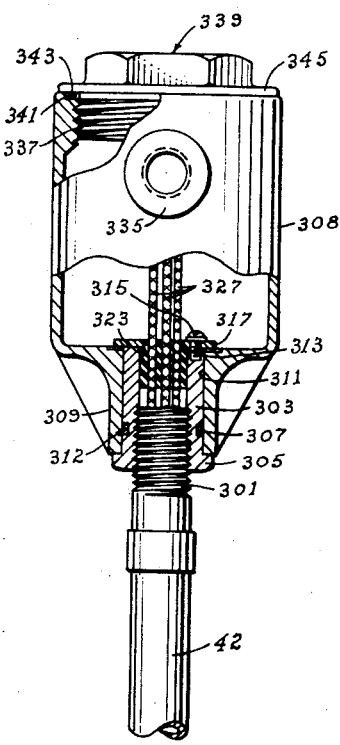
Figure 5 is a view of the device of Figure 4 viewed from the right thereof.

In the modified form, the conduit 42 is threaded at 301 to receive the sleeve 303 which is provided with a flange 305 at one end and a peripheral groove 307 adjacent the flange. The flange may be provided with wrench flats as shown in Figure 4. The junction box 308 has a boss 309 which is centrally bored at 311 to rotatably receive the sleeve. A gasket 312 which may be of the O-ring type seats in the groove 307 and bears on the sleeve to seal the joint between the sleeve and the boss.

The end of the sleeve 303 opposite the flange 305 is provided with three axially extending tapped holes 313 which receive screws 315 which extend through corresponding holes in the clamp plate 317. The screws are preferably held in place by suitable lock washers.

A stop arm 319 extends substantially radially from the clamp plate and is disposed to contact one side or the other of a stop 321 which is formed integrally with the junction box and which extends into the path of the stop arm as shown in Figure 6. The arm and stop serve to limit the rotation of the junction box to slightly less than 360 degrees in either direction.

Figure 7:
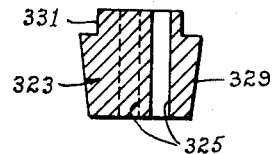
Figure 7 is a cross-sectional view of the conduit plug.

A conduit plug 323 (Fig. 7) of yieldable material such as synthetic rubber is provided with three holes 325 to receive the three motor leads 327 and is formed with an exterior taper 329 which is adapted to enter the open end of sleeve 303 into which it is axially compressed and held by the clamp plate and associated screws. The plug is compressed radially at the same time by reason of the taper and thus sealingly engages the leads and the sleeve to provide a vapor proof seal and also grips the leads strongly to prevent the transmission of strain to the connections at the motor.

The upper end of the plug has a cylindrical portion 331 which is adapted to enter a central guide hole 333 in the clamp plate.

The box is provided with a laterally extending boss 335 which is internally threaded to receive the conduit 41 which leads to the control box, the axis of the boss is preferably perpendicular to and intersects that of the boss 309 although it may, of course, be directed in any suitable direction.

The top of the box is preferably threaded at 337 to receive closure 339. A recess 341 is provided in the top face of the box to receive a gasket 343 which may be of the O-ring type. The gasket is compressed into the recess by the flange 345 on the closure.

A rib or web 347 extends from the box, preferably on the side opposite the boss 335 and the web is perforated to receive a bolt 348 which, with suitable washers, connects one end of a jumper 349, both mechanically and electrically, to the box.

The jumper is preferably of flexible woven wire construction and has its other end connected mechanically and electrically to the conduit 42 by means of the clamp 351, bolt 353 and suitable washers. The jumper is made sufficiently long so that the box may swivel in either direction to the degree determined by the stop mechanism without limitation by the jumper.

To assemble the junction box on the conduit 42, the sleeve 303 is screwed on threads 301 until tight, gasket 312 is installed, the motor leads are inserted in the boss 309 and the latter is positioned on the sleeve in sealing relation with the gasket.

Next the plug 323 is threaded on the leads and entered into the end of the sleeve. The leads are then threaded through the opening 333 in the clamp plate which is then installed and screwed down.

The jumper 349 is then bolted to the box and pipe.

After conduit 41 and the associated wires have been installed, the wires are connected to the motor leads in the usual manner, tucked into the box and the closure 339 is installed to produce a vapor proof conduit system for housing the electric wires.

While I have disclosed herein two specific forms of the invention, for purposes of illustration, it is obvious that various changes may be made in the form, construction and arrangement of parts without departing from the spirit of the invention and for this reason I do not wish to be limited to the specific forms disclosed but desire protection falling fairly within the scope of the appended claims.

I claim:

1. In a submerged pump and motor dispensing system, the combination of a tank having a flange at the top thereof, a first pipe having one end attached to the flange, a header attached to the other end of the pipe, means defining a flow passage in said header, a delivery pipe attached to said header in communication with said passage, said delivery pipe extending through said first pipe and terminating in said tank, a submerged pump and motor unit attached to the terminal of said pipe, said motor having leads connected to it for supplying power thereto, a first rigid conduit for said leads, sealingly attached to said motor and extending through said delivery pipe, flow passage and header, a power supply, electric wires connected with said supply, a second rigid conduit for enclosing said wires, a junction box defining a chamber, means for swivelly and sealingly mounting said box on one of said conduits, means for rigidly connecting the other of said conduits to said box, said box defining an access opening to said chamber, the ends of said wires and leads being brought into said chamber for connection and storage and a closure for said opening removably and sealingly mounted on said box.

2. In a submerged pump and motor dispensing system, the combination of a tank having a flange at the top thereof, a first pipe having one end attached to the flange, a header attached to the other end of the pipe, means defining a flow passage in said header, a delivery pipe attached to said header in communication with said passage, said delivery pipe extending through said first pipe and terminating in said tank, a submerged pump and motor unit attached to the terminal of said pipe, said motor having leads connected to it for supplying power thereto, a first rigid conduit for said leads, sealingly attached to said motor and extending through said delivery pipe, flow passage and header, means for sealing the joint between the conduit and header, a power supply, electric wires connected with said supply, a second rigid conduit for enclosing said wires, a junction box defining a chamber, means for swivelly and sealingly mounting said box on one of said conduits, means for rigidly connecting the other of said conduits to said box, said box defining an access opening to said chamber, the ends of said wires and leads being brought into said chamber for connection and storage and a closure for said opening removably and sealingly mounted on said box.

3. In a submerged pump and motor dispensing system, the combination of a tank having a flange at the top thereof, a first pipe having one end attached to the flange, a header attached to the other end of the pipe, means defining a flow passage in said header, a delivery pipe attached to said header in communication with said passage, said delivery pipe extending through said first pipe and terminating in said tank, a submerged pump and motor unit attached to the terminal of said pipe, said motor having leads connected to it for supplying power thereto, a first rigid conduit for said leads, sealingly attached to said motor and extending through said delivery pipe, flow passage and header, a power supply, electric wires connected with said supply, a second rigid conduit for enclosing said wires, a seal fitting disposed in said second conduit, a junction box defining a chamber, means for swivelly and sealingly mounting said box on one of said conduits, means for rigidly connecting the other of said conduits to said box, said box defining an access opening to said chamber, the ends of said wires and leads being brought into said chamber for connection and storage and a closure for said opening removably and sealingly mounted on said box.

4. In a submerged pump nad motor dispensing system, the combination of a tank having a flange at the top thereof, a first pipe having one end attached to the flange, a header attached to the other end of the pipe, means defining a flow passage in said header, a delivery pipe attached to said header in communication with said passage, said delivery pipe extending through said first pipe and terminating in said tank, a submerged pump and motor unit attached to the terminal of said pipe, said motor having leads connected to it for supplying power thereto, a first rigid conduit for said leads, sealingly attached to said motor and extending through said delivery pipe, flow passage and header, a power supply, electric wires connected with said supply, a second rigid conduit for enclosing said wires, a junction box defining a chamber, means for swivelly and sealingly mounting said box on one of said conduits, means for limiting the swivelling of said box, means for rigidly connecting the other of said conduits to said box, said box defining an access opening to said chamber, the ends of said wires and leads being brought into said chamber for connection and storage and a closure for said opening removably and sealingly mounted on said box.

5. In a submerged pump and motor dispensing system, the combination of a tank having a flange at the top thereof, a first pipe having one end attached to the flange, a header attached to the other end of the pipe, means defining a flow passage in said header, a delivery pipe attached to said header in communication with said passage, said delivery pipe extending through said first pipe and terminating in said tank, a submerged pump and motor unit attached to the terminal of said pipe, said motor having leads connected to it for supplying power thereto, a first rigid conduit for said leads, sealingly attached to said motor and extending through said delivery pipe, flow passage and header, a power supply, electric wires connected with said supply, a second rigid conduit for enclosing said wires, a junction box defining a chamber, means for swivelly and sealingly mounting said box on one of said conduits, a grounding strap connected in parallel across said swivel connection, means for rigidly connecting the other of said conduits to said box, said box defining an access opening to said chamber, the ends of said wires and leads being brought into said chamber for connection and storage and a closure for said opening removably and sealingly mounted on said box.

6. In a submerged pump and motor dispensing system, the combination of a tank having a flange at the top thereof, a first pipe having one end attached to the flange, a header attached to the other end of the pipe, means defining a flow passage in said header, a delivery pipe attached to said header in communication with said passage, said delivery pipe extending through said first pipe and terminating in said tank, a submerged pump and motor unit attached to the terminal of said pipe, said motor having leads connected to it for supplying power thereto, a first rigid conduit for said leads, sealingly attached to said motor and extending through said delivery pipe, flow passage and header, a power supply, electric wires connected with said supply, a second rigid conduit for enclosing said wires, a junction box defining a chamber, means for swively and sealingly mounting said box on one of said conduits, means for rigidly connecting the other of said conduits to said box, said box defining an access opening to said chamber, the ends of said wires and leads being brought into said chamber for connection and storage and a closure for said opening removably and sealingly mounted on said box and means in said chamber for holding said leads.

7. In a submerged pump and motor dispensing system, the combination of a tank having a flange at the top thereof, a first pipe having one end attached to the flange, a header attached to the other end of the pipe, means defining a flow passage in said header, a delivery pipe attached to said header in communication with said passage, said delivery pipe extending through said first pipe and terminating in said tank, a submerged pump and motor unit attached to the terminal of said pipe, said motor having leads connected to it for supplying power thereto, a first rigid conduit for said leads, sealingly attached to said motor and extending through said delivery pipe, flow passage and header, a power supply, electric wires connected with said supply, a second rigid conduit for enclosing said wires, a junction box defining a chamber, means for swively and sealingly mounting said box on one of said conduits, and stop means on said box and the conduit to which the box is swively connected for limiting the swivelling of said box to less than 360°, means for rigidly connecting the other of said conduits to said box, said box defining an access opening to said chamber, the ends of said wires and leads being brought into said chamber for connection and storage and a closure for said opening removably and sealingly mounted on said box.

8. In a submerged pump and motor dispensing system, the combination of a tank having a flange at the top thereof, a first pipe having one end attached to the flange, a header attached to the other end of the pipe, means defining a flow passage in said header, a delivery pipe attached to said header in communication with said passage, said delivery pipe extending through said first pipe and terminating in said tank, a submerged pump and motor unit attached to the terminal of said pipe, said motor having leads connected to it for supplying power thereto, a first rigid conduit for said leads, sealingly attached to said motor and extending through said delivery pipe, flow passage and header, a power supply, electric wires connected with said supply, a second rigid conduit for enclosing said wires, a junction box defining a chamber, means for swively and sealingly mounting said box on one of said conduits, means for rigidly connecting the other of said conduits to said box, said box defining an access opening to said chamber, the ends of said wires and leads being brought into said chamber for connection and storage and a closure for said opening removably and sealingly mounted on said box said mounting means comprising a sleeve fixedly and sealingly mounted on said one of said conduits, a hollow boss on the box rotatably mounted on said sleeve, and a resilient gasket mounted in a groove between said sleeve and boss.

9. In a submerged pump and motor dispensing system, the combination of a tank having a flange at the top thereof, a first pipe having one end attached to the flange, a header attached to the other end of the pipe, means defining a flow passage in said header, a delivery pipe attached to said header in communication with said passage, said delivery pipe extending through said first pipe and terminating in said tank, a submerged pump and motor unit attached to the terminal of said pipe, said motor having leads connected to it for supplying power thereto, a first rigid conduit for said leads, sealingly attached to said motor and extending through said delivery pipe, flow passage and header, a power supply, electric wires connected with said supply, a second rigid conduit for enclosing said wires, a junction box defining a chamber, means for swively and sealingly mounting said box on one of said conduits, means for rigidly connecting the other of said conduits to said box, said box defining an access opening to said chamber, the ends of said wires and leads being brought into said chamber for connection and storage and a closure for said opening removably and sealingly mounted on said box said mounting means comprising a sleeve fixedly and sealingly mounted on said one of said conduits, a hollow boss on the box rotatably mounted on said sleeve, and a resilient gasket mounted in a groove between said sleeve and boss and means for holding said boss and sleeve against relative endwise motion and means for holding said boss and sleeve against relative endwise motion.

10. A swivel junction box comprising means defining a chamber, at least two conduit receiving bosses, having non-parallel axes, communicating with said chamber, and an access opening to the chamber, a closure for said opening, means for swively connecting a rigid electric conduit to one of the bosses of said box, means for limiting the relative rotation of said box and conduit and wire holding means for preventing the transmission of tension from the portions of the wires in said box to portions of the wires in said conduit.

11. A swivel junction box comprising means defining a chamber, at least two conduit receiving bosses, having non-parallel axes, communicating with said chamber, and an access opening to the chamber, a closure for said opening, a conduit connecting means for fixedly connecting a rigid electric conduit to one of the bosses of the box, means for swively connecting an electric conduit to the other boss of said box, said latter conduit serving as a support for the box, a relatively long, yieldable grounding strap connecting said box with said last mentioned conduit and wire holding means for preventing the transmission of tension from portions of wires in said box to portions of such wires in said last mentioned conduit.

12. A swivel junction box comprising means defining a chamber and an access opening to the chamber, a closure for said opening, means for swively connecting a rigid electric conduit to said box for supporting the box and a relatively slack, yieldable grounding strap connected to the box and conduit across said connecting means to maintain said ground in any swivelled position of said box relative to said conduit.

13. A swivel junction box comprising means defining a chamber, at least two conduit receiving bosses, having non-parallel axes, communicating with said chamber, and an access opening to the chamber, a closure for said opening, means for swively connecting a rigid electric conduit to said box through one of said bosses and means in said box for holding the wires which enter the chamber from said conduit against lengthwise movement into the box through the swively connected conduit.

14. A swivel junction box comprising means defining a chamber, at least two conduit receiving bosses, having non-parallel axes, communicating with said chamber, and an access opening to the chamber, a closure for the opening, a conduit connecting sleeve rotatably mounted in one of said bosses, a resilient gasket for sealing the joint between the sleeve and said boss and means for preventing the transmission of tension from portions of wires in said box to portions of such wires in said sleeve.

15. A swivel junction box comprising means defining a chamber and an access opening to the chamber, a closure for the opening, a hollow boss formed on the box, a conduit connecting sleeve fixed to and supported by a rigid conduit and rotatably mounted in the boss, a resilient gasket for sealing the joint between the sleeve and boss, a compressed, resilient plug disposed in the inner end of the sleeve for holding electric wires in the sleeve against lengthwise movement, a plate, means for mounting said plate on the sleeve in contact with the upper portion of said plug for movement toward the plug to compress the plug in the sleeve.

16. The structure defined by claim 15 wherein the plug is tapered so as to tightly engage the wires and the bushing as the plug is forced into said sleeve by said plate.

17. A swivel junction box comprising means defining a chamber and an access opening to the chamber, a closure for the opening, a hollow boss formed on the box, a conduit connecting sleeve fixed to and supported by a rigid conduit and rotatably mounted in the boss, a resilient gasket for sealing the joint between the sleeve and boss, a compressed, resilient plug disposed in the inner end of the sleeve for holding electric wires in the sleeve against lengthwise movement, a plate, means for mounting said plate on the sleeve in contact with the upper portion of said plug for movement toward the plug to compress the plug in the sleeve, a first stop on the plate and a second stop on the box disposed for cooperation with the first stop to limit the relative rotation of the box and sleeve.

18. The structure defined in claim 17 wherein the sleeve has a flange formed on its outer end for engagement with the end of the boss, to limit relative axial movement of said sleeve and box in one direction, said plate extending laterally beyond said sleeve for contact with said box to limit relative axial movement of said sleeve and box in an opposite direction.

References Cited in the file of this patent

UNITED STATES PATENTS

| | | |
|---|---|---|
| Re. 19,132 | McGuirk | Apr. 3, 1934 |
| 413,215 | Warde | Oct. 22, 1889 |
| 757,992 | Clark | Apr. 19, 1904 |
| 1,625,536 | Gronner | Apr. 19, 1927 |
| 2,280,087 | Hollander et al. | Apr. 21, 1942 |
| 2,299,878 | Chandler | Oct. 27, 1942 |
| 2,325,930 | Avigdor | Aug. 3, 1943 |
| 2,509,563 | Crashow | May 30, 1950 |